United States Patent
Sasayama et al.

(10) Patent No.: US 9,607,430 B2
(45) Date of Patent: Mar. 28, 2017

(54) GRADATION DRAWING DEVICE

(75) Inventors: Kotoyu Sasayama, Tokyo (JP); Shoichiro Kuboyama, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 188 days.

(21) Appl. No.: 14/377,754

(22) PCT Filed: Feb. 10, 2012

(86) PCT No.: PCT/JP2012/000912
§ 371 (c)(1),
(2), (4) Date: Aug. 8, 2014

(87) PCT Pub. No.: WO2013/118190
PCT Pub. Date: Aug. 15, 2013

(65) Prior Publication Data
US 2015/0029191 A1    Jan. 29, 2015

(51) Int. Cl.
*G06T 15/83* (2011.01)
*G06T 15/50* (2011.01)
*G06T 19/00* (2011.01)

(52) U.S. Cl.
CPC .............. *G06T 15/83* (2013.01); *G06T 15/50* (2013.01); *G06T 19/00* (2013.01); *G06T 2210/62* (2013.01); *G06T 2219/2012* (2013.01)

(58) Field of Classification Search
CPC ...................................................... G06T 15/83
See application file for complete search history.

(56) References Cited

U.S. PATENT DOCUMENTS

| | | | |
|---|---|---|---|
| 6,593,922 B1 * | 7/2003 | Shimono | G06T 15/20 345/419 |
| 6,677,944 B1 * | 1/2004 | Yamamoto | G06T 17/00 345/422 |
| 2013/0038630 A1 | 2/2013 | Otsuru | |

FOREIGN PATENT DOCUMENTS

| | | |
|---|---|---|
| JP | 2004-054584 A | 2/2004 |
| JP | 2006-318389 A | 11/2006 |
| JP | 2007-140842 A | 6/2007 |
| JP | 2010-165058 A | 7/2010 |
| WO | WO 2011/101904 A1 | 8/2011 |
| WO | WO 2011/128939 A1 | 10/2011 |

* cited by examiner

*Primary Examiner* — Haixia Du
*Assistant Examiner* — Grace Q Li
(74) *Attorney, Agent, or Firm* — Birch, Stewart, Kolasch & Birch, LLP

(57) ABSTRACT

A model generator 2 arranges a three-dimensional model on a base line. A model renderer 4 renders the three-dimensional model. A distance map generator 5 converts each depth of the three-dimensional model rendered into a distance from the base line. An alpha map generator 7 converts the distance from the base line into an alpha value.

3 Claims, 6 Drawing Sheets

Base Line

FIG.10

Base Line

GRADATION DRAWING DEVICE

FIELD OF THE INVENTION

The present invention relates to a gradation drawing device that can generate an alpha map dependent upon a distance from a base line in real time.

BACKGROUND OF THE INVENTION

As a method of implementing gradation drawing having a change in the lights and shades of identical colors and a change in the lights and shades of different colors on a display, there is a method of providing a base line used as a reference for gradation drawing and converting the distance between each pixel and the base line into a color (for example, refer to patent reference 1). Further, as another method, there is a method of implementing gradation drawing by using an alpha blend function which is supported by two-dimensional drawing hardware (for example, refer to patent reference 2). A gradation drawing device described in patent reference 2 generates a three-dimensional model according to a gradation shape expected, and sets a depth after rendering of the three-dimensional model to an alpha value.

RELATED ART DOCUMENT

Patent Reference

Patent reference 1: Japanese Unexamined Patent Application Publication No. 2010-165058
Patent reference 2: WO 2011/101904

SUMMARY OF THE INVENTION

Problems to be Solved by the Invention

However, a problem with the method described in patent reference 2 is that when generating a plurality of alpha maps to which gradation effects different according to the distance from the base line are set, the number of times that the process of rendering the three-dimensional model is performed and the frequency of access to a frame buffer increases, and therefore the processing time increases. Further, a problem with the method described in patent reference 1 is that because the distance between each of a plurality of base lines and each pixel is determined by using software, it takes much time to determine the distance set to each pixel.

The present invention is made in order to solve the above-mentioned problems, and it is therefore an object of the present invention to provide a gradation drawing device that can generate an alpha map at a high speed.

Means for Solving the Problem

In accordance with the present invention, there is provided a gradation drawing device including: a model renderer that renders a three-dimensional model arranged on a base line; a distance map generator that converts each depth of the three-dimensional model rendered into the distance from the base line; and an alpha map generator that converts the distance from the base line into an alpha value.

Advantages of the Invention

Because the gradation drawing device in accordance with the present invention arranges a three-dimensional model on a base line, converts each depth of the three-dimensional model rendered into the distance from the base line, and converts the distance from the base line into an alpha value, the gradation drawing device can generate an alpha map is at a high speed.

EMBODIMENTS OF THE INVENTION

Hereafter, in order to explain this invention in greater detail, the preferred embodiments of the present invention will be described with reference to the accompanying drawings.

Embodiment 1

Figure 1:
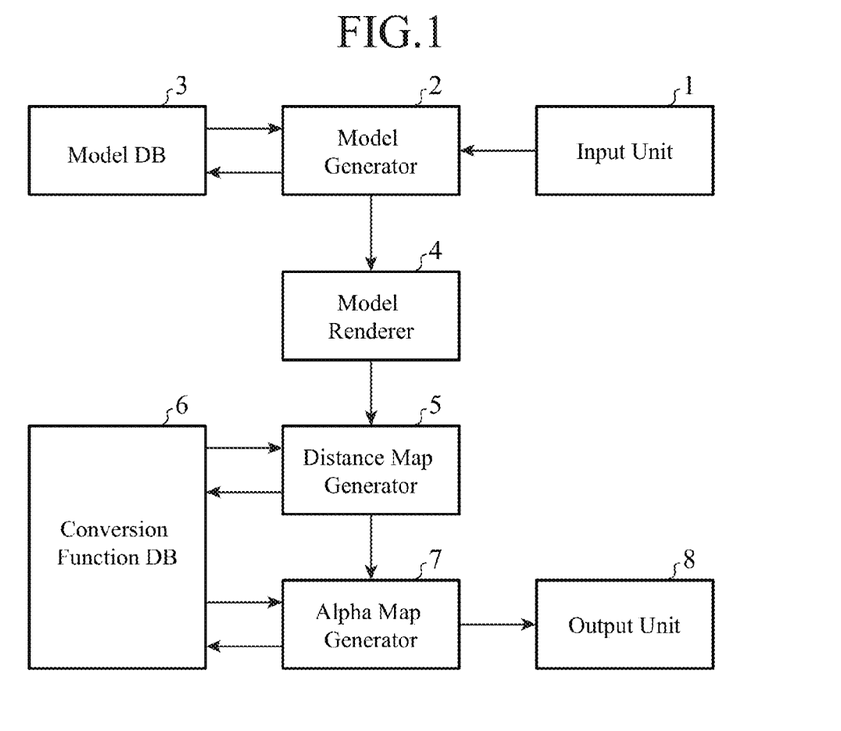
FIG. 1 is a block diagram showing a gradation drawing device in accordance with Embodiment 1 of the present invention.

FIG. 1 is a block diagram showing a gradation drawing device in accordance with Embodiment 1. Referring to FIG. 1, the gradation drawing device includes an input unit 1, a model generator 2, a model database (model DB) 3, a model renderer 4, a distance map generator 5, a conversion function database (conversion function DB) 6, an alpha map generator 7, and an output unit 8. The input unit 1 is an input interface for inputting parameters for model generation, and the coordinates of a base line used as a reference for gradation drawing. The model generator 2 is a processing unit for generating a model to be arranged on the base line by using model data in the model database 3. The model database 3 stores basic shape models, such as cones and triangular pyramids.

The model renderer 4 is a processing unit for rendering the model generated by the model generator 2. The distance map generator 5 is a processing unit for converting each depth in a frame buffer (not shown) after the rendering into the distance from the base line on the basis of data in the conversion function database 6. The conversion function database 6 stores conversion functions each of which is used by the distance map generator 5 and converts each depth into the distance, and conversion functions each of which is used by the alpha map generator 7 and converts the distance into an alpha value. The alpha map generator 7 is a processing unit for converting the distance from the base line into an alpha value on the basis of a conversion table of a conversion function stored in the conversion function database 6. The output unit 8 is an external interface for outputting the generated alpha map.

Next, the operation of the gradation drawing device in accordance with Embodiment 1 will be explained. First, the input unit 1 inputs parameters for generating a model and a base line, and so on. The model generator 2 determines a model to be used from the inputted parameters and acquires the model to be used from the model database 3. In this case, the model generator can select a plurality of models. For example, when arranging models on the base line composed of a polyline, the models can be used properly according to area, type, etc. For example, different models are used on lines and on nodes. The model generator 2 performs scaling, rotation, and translation on the model to be used to arrange the model on the base line. Next, the model renderer 4 renders the model arranged on the base line by parallel projection of the model from directly above the model. The distance map generator 5 then acquires each depth in the frame buffer after the rendering of the model, and converts the depth into the distance from the base line. At the time of the conversion, the distance map generator uses an appropriate conversion function acquired from the conversion function database 6. Next, the alpha map generator 7 converts the distance from the base line generated by the distance map generator 5 into an alpha value. Finally, the output unit 8 outputs the generated alpha map to outside the device.

Figure 2:
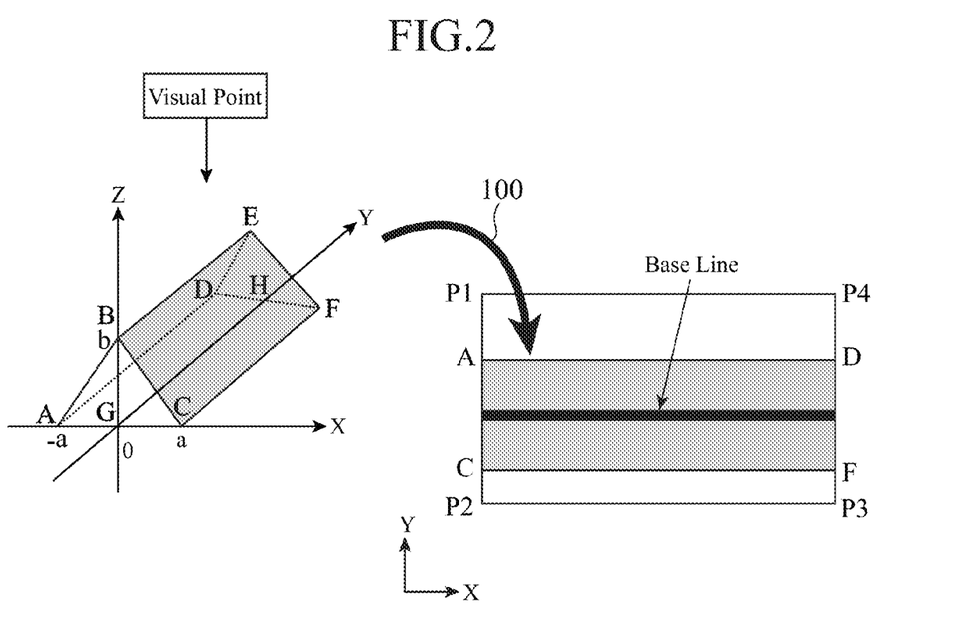
FIG. 2 is an explanatory drawing showing the operation of a model renderer in the gradation drawing device in accordance with Embodiment 1 of the present invention.
Figure 3:
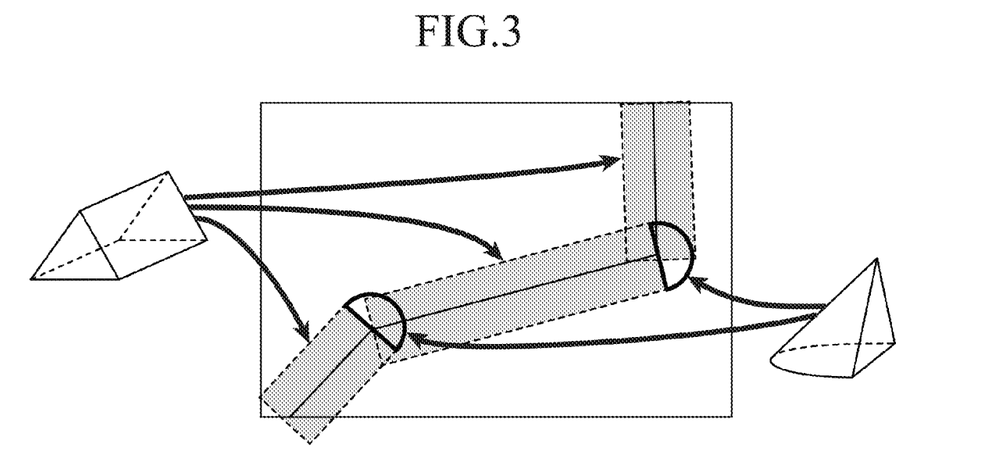
FIG. 3 is an explanatory drawing showing the operation of another example of the model renderer in the gradation drawing device in accordance with Embodiment 1 of the present invention.

Next, a flow of the process performed by the model renderer 4 will be explained by using FIG. 2. FIG. 2 shows a state of arranging a model in the shape a triangular prism on the base line, as an example of the model arrangement. The axes of this model show a local coordinate system, and this model is symmetrical with respect to the Z axis on an XZ plane. It is thus assumed that the model is a bilaterally symmetrical graphic because the model is rendered by parallel projection of the model from a visual point and each depth is converted into the distance. A triangular prism model, such as a model GBC-HEF, can be alternatively acquired from the model database 3, and two triangular prism models can be combined to generate a model ABC-DEF. Scaling, rotation, and parallel translation are performed on this model to arrange the model on the base line (in the figure, refer to an arrow 100). In this example, a state in which the model is arranged on the base line composed of two vertexes respectively placed on sides of a display having a size of P1-P2-P3-P4 is shown. Further, an example of using a plurality of models is shown in FIG. 3. In FIG. 3, a state in which a model in the shape a triangle is arranged on each line and a model in the shape a quarter sphere is arranged on each node is shown.

Because the process is performed this way, by using a plurality of models appropriately according to the scene, the rendering can be implemented using a smaller number of models. Therefore, the rendering speed can be improved.

Figure 4:
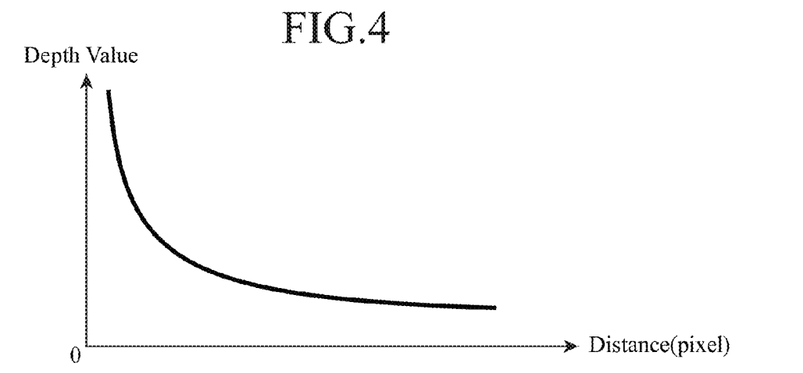
FIG. 4 is an explanatory drawing showing a conversion function of converting a depth into a distance in the gradation drawing device in accordance with Embodiment 1 of the present invention.
Figure 5:
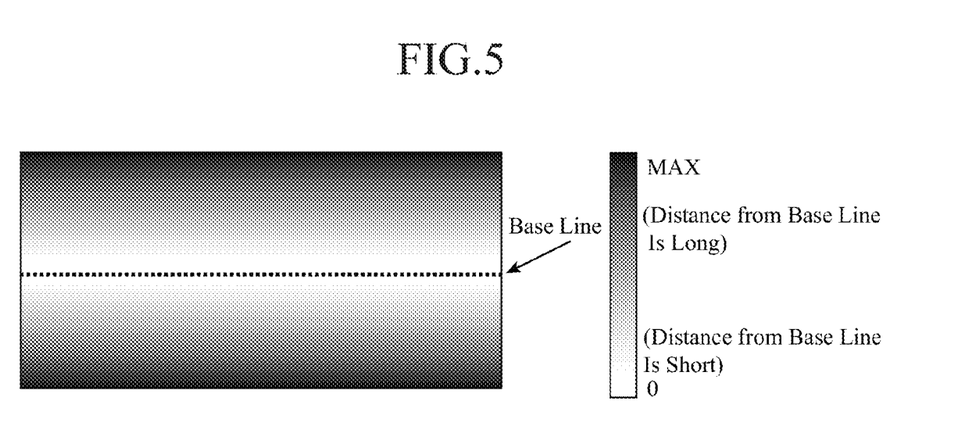
FIG. 5 is an explanatory drawing showing a distance map after the conversion in the gradation drawing device in accordance with Embodiment 1 of the present invention.

A flow of the process performed by the distance map generator 5 will be explained by using FIG. 4. FIG. 4 shows a conversion function of converting each depth into the distance. For this function, a conversion table acquired from the conversion function database 6 is used. As an alternative, a look-up table which receives each depth as an input value and outputs the distance can be defined to speed up the process. According to such a conversion table, a distribution (distance map) acquired by converting each depth into the distance is shown in FIG. 5.

Figure 6:
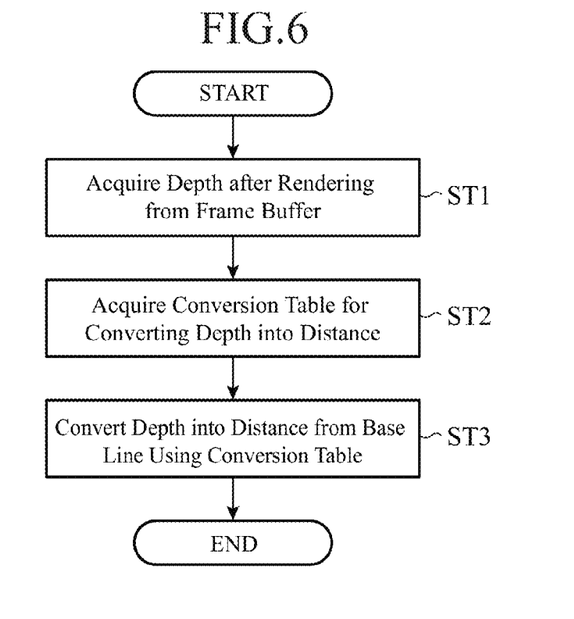
FIG. 6 is a flow chart showing the operation of a distance map generator in the gradation drawing device in accordance with Embodiment 1 of the present invention.

Furthermore, a flow of the process performed by the distance map generator 5 will be explained by using FIG. 6. FIG. 6 is a flow chart showing the process of converting each depth into the distance from the base line. First, the distance map generator, in step ST1, acquires a depth after the rendering of a three-dimensional model from the frame buffer. Next, the distance map generator, in step ST2, acquires a conversion table for converting the depth into the distance from the conversion function database 6. The distance map generator finally, in step ST3, converts the depth into the distance from the base line by using the acquired conversion table. In this process, the gradation drawing is performed the number of times corresponding to the number of pixels. In this case, each step can be processed the number of times corresponding to the number of pixels, or the set of steps ST1 to ST3 can be repeated the number of times corresponding to the number of pixels.

Figure 7:
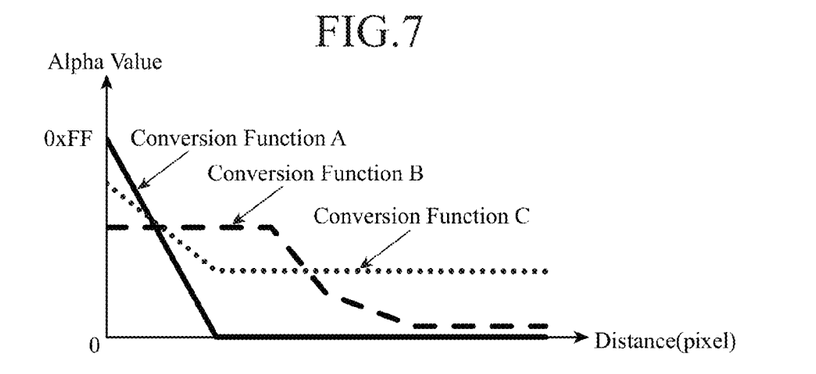
FIG. 7 is an explanatory drawing showing a conversion function of converting the distance into an alpha value in the gradation drawing device in accordance with Embodiment 1 of the present invention.
Figure 8:
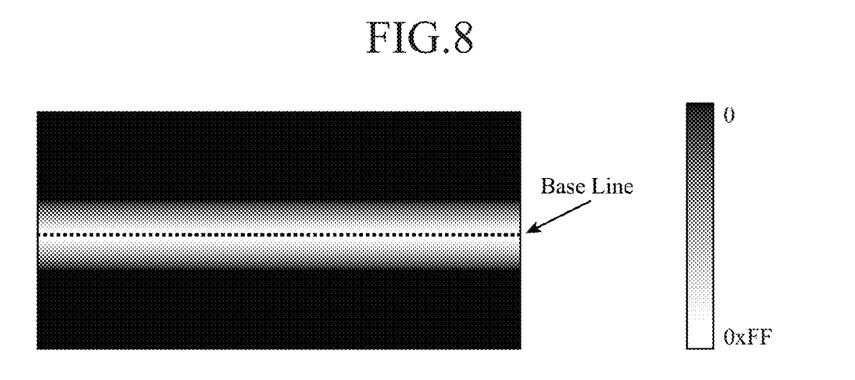
FIG. 8 is an explanatory drawing showing an alpha map in which the distance is converted into an alpha value by using a conversion function A in the gradation drawing device in accordance with Embodiment 1 of the present invention.
Figure 9:
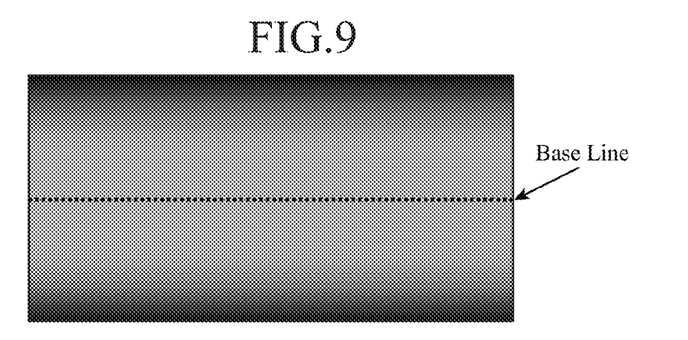
FIG. 9 is an explanatory drawing showing an alpha map in which the distance is converted into an alpha value by using a conversion function B in the gradation drawing device in accordance with Embodiment 1 of the present invention.
Figure 10:
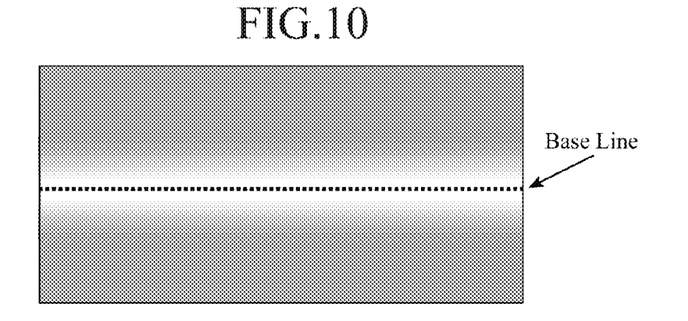
FIG. 10 is an explanatory drawing showing an alpha map in which the distance is converted into an alpha value by using a conversion function C in the gradation drawing device in accordance with Embodiment 1 of the present invention.

Next, a flow of the process performed by the alpha map generator 7 will be explained by using FIGS. 7 to 10. FIG. 7 shows an example of the conversion functions stored in the conversion function database 6. When the alpha map generator 7 performs the process of converting the distance from the base line into an alpha value by using a conversion function A, an alpha map shown in FIG. 8 is acquired. As an alternative, when the alpha map generator 7 performs the process of converting the distance from the base line into an alpha value by using a conversion function B, an alpha map shown in FIG. 9 is acquired. As an alternative, when the alpha map generator 7 performs the process of converting the distance from the base line into an alpha value by using a conversion function C, an alpha map shown in FIG. 10 is acquired. Such a conversion function can be defined as a function, or can be defined as a look-up table to speed up the process.

The alpha map generated by the alpha map generator 7 is then sent to outside the device by the output unit 8.

As mentioned above, by generating the distance map in which the distance from the base line is stored before generating an alpha map, the process of determining the distance between each pixel and the base line can be shortened. As a result, an alpha map can be generated at a high speed.

Further, by disposing a plurality of functions each of which converts the distance into an alpha value, a plurality of alpha values can be calculated for an identical pixel value. By performing this way, the gradation drawing device can implement gradation having a plurality of effects for the base line.

Further, because by using a plurality of models appropriately according to the scene, the gradation drawing device can implement the rendering using a smaller number of models, the gradation drawing device can improve the rendering speed.

As previously explained, because the gradation drawing device in accordance with Embodiment 1 includes the model renderer that renders a three-dimensional model arranged on a base line, the distance map generator that converts each depth of the three-dimensional model after the rendering into the distance from the base line, and the alpha map generator that converts the distance from the base line into an alpha value, the gradation drawing device can generate an alpha map at a high speed.

Further, because the gradation drawing device in accordance with Embodiment 1 includes a plurality of functions each showing a relationship between the distance from the base line and an alpha value, and the alpha map generator generates an alpha map for each of the plurality of functions respectively, the gradation drawing device can implement gradation having a plurality of effects for the base line.

Embodiment 2

Although each depth after the rendering of a three-dimensional model is converted into the distance in Embodiment 1, the conversion into the distance can be performed by using a color value, instead of using the depth. This example will be explained as Embodiment 2. In this embodiment, because this embodiment has the same structure as Embodiment 1 in terms of drawings, the structure in accordance with Embodiment 2 will be explained by using FIG. 1.

A model renderer 4 in accordance with Embodiment 2 is constructed in such a way as to render a three-dimensional model arranged on a base line by using color values respectively corresponding to the positions of the vertexes of the three-dimensional model. Further, a distance map generator 5 is constructed in such a way as to convert each of the color values after the rendering into the distance from the base line. In addition, a conversion table of a conversion function of converting each of the color values after the rendering into the distance is stored in a conversion function database 6. A structure other than this structure is the same as that in accordance with Embodiment 1.

Figure 11:
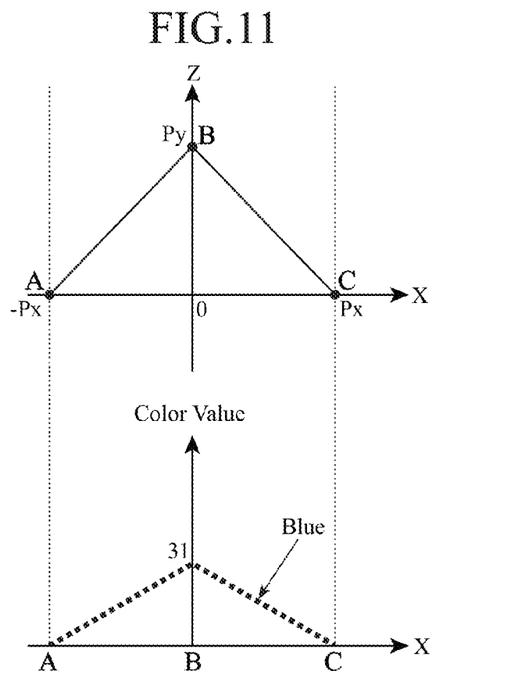
FIG. 11 is an explanatory drawing showing vertex coordinates and color settings of a model in a gradation drawing device in accordance with Embodiment 2 of the present invention.

Next, an operation of Embodiment 2 will be explained. In Embodiment 2, the fact that a process of respectively setting different colors to the vertexes of one polygon and rendering this polygon makes it possible to generate a polygon on which gradation drawing is performed is used. Hereafter, drawing using drawing hardware which complies with ARGB1555 will be explained as an example. Although the same model geometry as that shown in FIG. 2 is used, different colors are set to the vertexes of a polygon, respectively, as shown in an upper figure of FIG. 11, and rendering is performed. Because each color serves as each depth shown in Embodiment 1, the color of each vertex of the polygon is set according to the value of the Z coordinate of each vertex. For example, when only B (blue value) among RGB is used, B=0 is set to vertexes A, C, D, and F of the model and B=31 is set to vertexes B and E of the model, as shown in a lower figure of FIG. 11.

Figure 12:
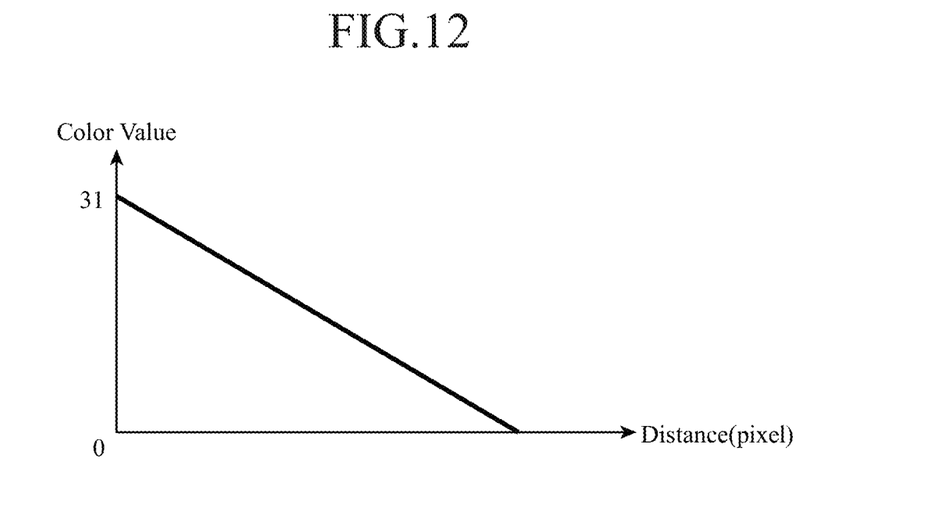
FIG. 12 is an explanatory drawing showing a conversion function of converting a color value into a distance in the gradation drawing device in accordance with Embodiment 2 of the present invention.

On the basis of each of the color values of the model rendered by the model renderer 4, the distance map generator 5 converts the color value into the distance from the base line. A conversion table of conversion from each of the color values to the distance which is used in Embodiment 2 is shown in FIG. 12. An operation which is performed after the conversion into the distance using such a conversion table is the same as that in accordance with Embodiment 1.

Figure 13:
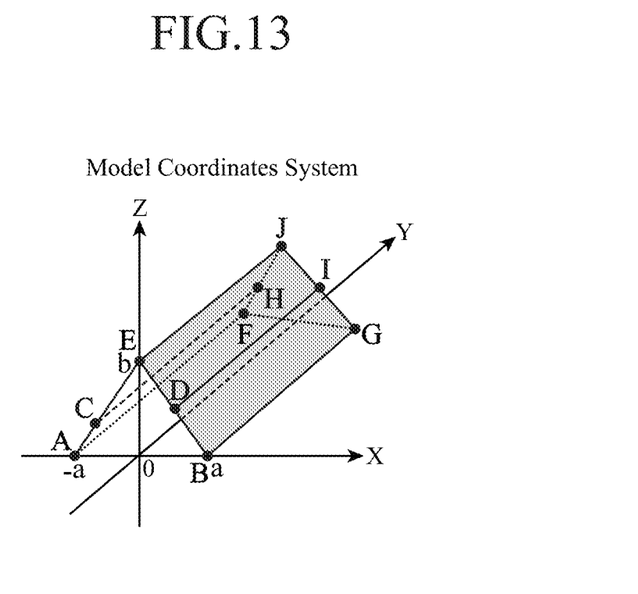
FIG. 13 is an explanatory drawing showing a model geometry of a model renderer in the gradation drawing device in accordance with Embodiment 2 of the present invention.
Figure 14:
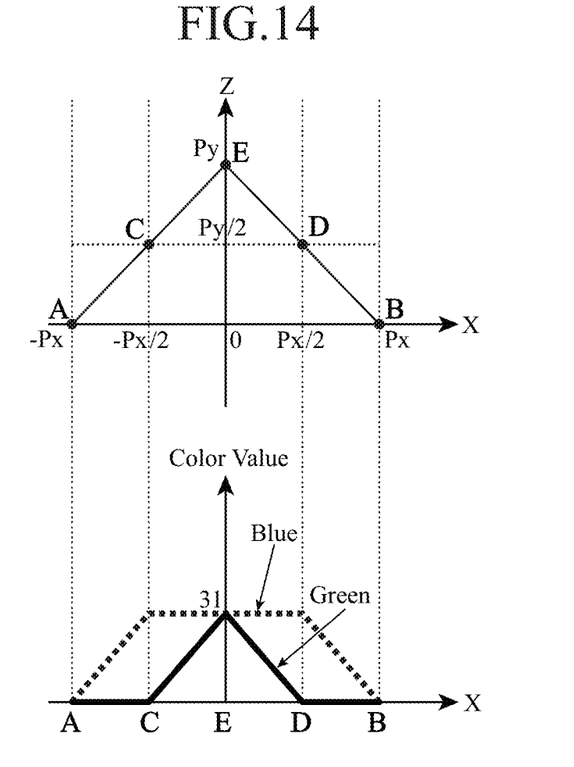
FIG. 14 is an explanatory drawing showing another example of the vertex coordinates and the color settings of the model in the gradation drawing device in accordance with Embodiment 2 of the present invention.

Further, because the addition of four vertexes to the model shown in FIG. 2, as shown in FIG. 13, makes it possible to specify the vertex colors finely, the resolution ability is improved. As shown in FIG. 14, the Z values of C, D, H, and I are one half of those of E and J, respectively, and the X values of C, D, H, and I are one half of those of A, B, F, and G, respectively. For example, when blue and green are used, by setting G=0 to the vertexes A, C, D, B, F, H, I, and G, G=31 to the vertexes E and J, B=0 to the vertexes A, B, F, and G, and B=31 to the vertexes C, D, E, H, I, and J, and then performing rendering, the resolution ability can be doubled.

As previously explained, because the gradation drawing device in accordance with Embodiment 2 includes the model renderer that renders a three-dimensional model arranged on a base line by using color values respectively corresponding to the positions of the vertexes of the three-dimensional model, and the distance map generator that converts each of the color values after the rendering into the distance from the base line, and the alpha map generator that converts the distance from the base line into an alpha value, the gradation drawing device can generate an alpha map at a high speed.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

As mentioned above, the gradation drawing device in accordance with the present invention determines the distance from a base line on the basis of the depths or the color values of a three-dimensional model, and converts the distance into an alpha value, and is suitable for use in, for example, a car navigation device or the like that displays a map with gradation.

EXPLANATIONS OF REFERENCE NUMERALS

1 input unit, 2 model generator, 3 model database, 4 model renderer, 5 distance map generator, 6 transform function database, 7 alpha map generator, 8 output unit.

The invention claimed is:
1. A gradation drawing device to generate alpha map at high speed comprising:

a model renderer that renders a three-dimensional model arranged directly on a base line by using color values respectively corresponding to positions of vertexes of said three-dimensional model;

a distance map generator that converts each of the color values after the rendering into a distance from said base line;

an alpha map generator that generates an alpha map by converting the distance from said base line into an alpha value using a conversion function; and an external interface that outputs the generated alpha map.

2. The gradation drawing device according to claim 1, wherein when the three-dimensional model is projected on a display, the base line is composed of the two vertexes of the three dimensional model respectively placed on sides of the display.

3. The gradation drawing device according to claim 1, wherein the baseline is a polyline.

\* \* \* \* \*